United States Patent
Naser et al.

(10) Patent No.: US 11,010,622 B2
(45) Date of Patent: May 18, 2021

(54) INFRASTRUCTURE-FREE NLOS OBSTACLE DETECTION FOR AUTONOMOUS CARS

(71) Applicants: TOYOTA RESEARCH INSTITUTE, INC., Los Altos, CA (US); MASSACHUSETTS INSTITUTE OF TECHNOLOGY, Cambridge, MA (US)

(72) Inventors: Felix Maximilian Naser, Cambridge, MA (US); Igor Gilitschenski, Cambridge, MA (US); Alexander Andre Amini, Cambridge, MA (US); Christina Liao, Cambridge, MA (US); Guy Rosman, Newton, MA (US); Sertac Karaman, Cambridge, MA (US); Daniela Rus, Weston, MA (US)

(73) Assignees: TOYOTA RESEARCH INSTITUTE, INC., Los Altos, CA (US); MASSACHUSETTS INSTITUE OF TECHNOLOGY, Cambridge, MA (US)

(\*) Notice: Subject to any disclaimer, the term of this patent is extended or adjusted under 35 U.S.C. 154(b) by 0 days.

(21) Appl. No.: 16/730,613

(22) Filed: Dec. 30, 2019

(65) Prior Publication Data
US 2020/0143179 A1     May 7, 2020

Related U.S. Application Data

(63) Continuation-in-part of application No. 16/179,223, filed on Nov. 2, 2018.
(Continued)

(51) Int. Cl.
*G06K 9/46* (2006.01)
*G06K 9/00* (2006.01)
(Continued)

(52) U.S. Cl.
CPC ....... *G06K 9/00805* (2013.01); *G05D 1/0088* (2013.01); *G05D 1/0223* (2013.01);
(Continued)

(58) Field of Classification Search
CPC ............. G06K 9/00805; G06K 9/3233; G06K 9/6202; G06K 9/6277; G06K 9/3208;
(Continued)

(56) References Cited

U.S. PATENT DOCUMENTS

| 2005/0168651 A1* | 8/2005 | Morino | G06T 7/246 348/700 |
| 2010/0054536 A1* | 3/2010 | Huang | G06K 9/32 382/103 |

(Continued)

FOREIGN PATENT DOCUMENTS

| CN | 109033951 A | 12/2018 |
| JP | 2014038401 A * | 2/2014 |

OTHER PUBLICATIONS

Yedidia, "Using Unknown Occluders to Recover Hidden Scenes", Computer Vision Foundation, 2019.
(Continued)

*Primary Examiner* — Said M Elnoubi
(74) *Attorney, Agent, or Firm* — Seyfarth Shaw LLP

(57) ABSTRACT

A method of non-line-of-sight (NLoS) obstacle detection for an ego vehicle is described. The method includes capturing a sequence of images over a period with an image capture device. The method also includes storing the sequence of images in a cyclic buffer. The method further includes registering each image in the cyclic buffer to a projected image. The method includes performing the registering by estimating a homography H for each frame of the sequence of images to project to a view point of a first frame in the sequence of images and remove motion of the ego vehicle in
(Continued)

the projected image. The method also includes enhancing the projected image. The method further includes classifying the projected image based on a scene determination. The method also includes issuing a control signal to the vehicle upon classifying the projected image.

20 Claims, 6 Drawing Sheets

Related U.S. Application Data

(60) Provisional application No. 62/915,570, filed on Oct. 15, 2019.

(51) Int. Cl.
    *G05D 1/02*     (2020.01)
    *G05D 1/00*     (2006.01)
    *G06K 9/32*     (2006.01)
    *G06K 9/62*     (2006.01)

(52) U.S. Cl.
    CPC ......... *G06K 9/3233* (2013.01); *G06K 9/6202* (2013.01); *G06K 9/6277* (2013.01); *G05D 2201/0213* (2013.01)

(58) Field of Classification Search
    CPC ............. G06K 9/4652; G06K 9/00791; G06K 9/6267; G06K 9/6256; G05D 1/0223; G05D 1/0088; G05D 2201/0213; G05D 1/0246; G06T 7/136; G06T 7/20; G06T 2207/10028; G06T 2207/10044; G06T 2207/30252; G06T 7/11; B60W 40/04
    See application file for complete search history.

(56) References Cited

U.S. PATENT DOCUMENTS

2018/0350084 A1* 12/2018 Tamir ................... G06T 7/292
2019/0086549 A1* 3/2019 Ushani ................ G05D 1/0214
2019/0339706 A1* 11/2019 Batur .................... G06T 7/20

OTHER PUBLICATIONS

Naser, "Detection of Dynamic Obstacles Out of the Line of Sight for Autonomous Vehicles to Increase Safety Based on Shadows", Massachusetts Institute of Technology (Thesis), Feb. 2019.
Barcellos, "Shadow Detection in Camera-based Vehicle Detection: Survey and Analysis", Journal of Electronic Imaging, May 2016, vol. 25, No. 5, pp. 051205 (1-14).

* cited by examiner

INFRASTRUCTURE-FREE NLOS OBSTACLE DETECTION FOR AUTONOMOUS CARS

CROSS-REFERENCE TO RELATED APPLICATION

This application is a continuation-in-part of U.S. patent application Ser. No. 16/179,223, entitled "SYSTEMS AND METHODS OF DETECTING MOVING OBSTACLES," filed on Nov. 2, 2018, and claims the benefit of U.S. Provisional Patent Application No. 62/915,570, filed on Oct. 15, 2019, and titled "INFRASTRUCTURE-FREE NLoS OBSTACLE DETECTION FOR AUTONOMOUS CARS," the disclosures of which are expressly incorporated by reference herein in their entireties.

FIELD OF TECHNOLOGY

The present disclosure relates to machine vision and detection of obstacles, more particularly, to non-line-of-sight (NLoS) obstacle detection for autonomous vehicles.

BACKGROUND

The introduction and exploration of machine vision, machine learning, and autonomous vehicles has led to many advances in perception for mobile robotics and autonomous vehicles in non-line-of-sight (NLoS) scenarios. Existing systems in this context may rely on ultra-wideband (UWB) systems for localization or use Wi-Fi signals for NLoS perception. One possible approach for enabling mobile robotics to explicitly see around corners uses a drone or other unmanned aerial vehicle (UAV), which can be launched from a car as an additional source of information. Such an approach involves extensive and expensive hardware infrastructure, assumptions about the occluding material, and deployment of drones. Consideration of occlusion for intelligent transportation systems primarily focuses on improved tracking by improving detectors and detection of other vehicles and pedestrians, while assuming partial visibility or a merely temporary occlusion. Explicit modelling of occlusions is also used for broader scene understanding.

In machine vision and learning systems, processing of shadows focuses on their removal. For mobile robotics, shadow removal is particularly relevant for improving visual localization, in particular, because shadow removal enables generating a more weather invariant representation of the environment. Computer vision can also be used to recover or construct hidden scenes. Such techniques, which infer data about the hidden scenery, usually rely on time-of-flight cameras. These systems, however, are prone to interference from other unpredictable lighting sources and, therefore, mostly rely on carefully controlled environments.

SUMMARY

A method of non-line-of-sight (NLoS) obstacle detection for an ego vehicle is described. The method includes capturing a sequence of images over a period with an image capture device. The method also includes storing the sequence of images in a cyclic buffer. The method further includes registering each image in the cyclic buffer to a projected image. The method includes performing the registering by estimating a homography H for each frame of the sequence of images to project to a view point of a first frame in the sequence of images and remove motion of the ego vehicle in the projected image. The method also includes enhancing the projected image. The method further includes classifying the projected image based on a scene determination. The method also includes issuing a control signal to the vehicle upon classifying the projected image.

A non-transitory computer-readable medium having program code recorded thereon for non-line-of-sight (NLoS) obstacle detection of an ego vehicle is described. The program code is executed by a processor. The non-transitory computer-readable medium includes program code to capture a sequence of images over a period with an image capture device. The non-transitory computer-readable medium also includes program code to store the sequence of images in a cyclic buffer. The non-transitory computer-readable medium further includes program code to register each image in the cyclic buffer to a projected image by program code to estimate a homography H for each frame of the sequence of images to project to a view point of a first frame in the sequence of images and remove motion of the ego vehicle in the projected image. The non-transitory computer-readable medium also includes program code to enhance the projected image. The non-transitory computer-readable medium also includes program code to classify the projected image based on a scene determination. The non-transitory computer-readable medium further includes program code to issue a control signal to the vehicle upon classifying the projected image.

A system for non-line-of-sight (NLoS) obstacle detection in an ego vehicle is described. The system includes an image capture device configured to capture a sequence of images over a period. The system also includes a cyclic buffer configured to store the sequence of images. The system further includes a registered buffer configured to register each image in the cyclic buffer to a projected image in the registered buffer by an image rectifier. The system includes the image rectifier configured to estimate a homography H for each frame of the sequence of images to project to a view point of a first frame in the sequence of images and remove motion of the ego vehicle in the projected image. The system further includes an image processor configured to enhance the projected image. The system also includes an image classifier configured to classify the projected image based on a scene determination. The system further includes a vehicle planner in communication with a vehicle controller, the vehicle planner configured to issue a control signal to the vehicle controller upon classifying the projected image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

Aspects of devices, systems, and methods are illustrated in the figures of the accompanying drawings, which are meant to be exemplary and non-limiting, in which like references are intended to refer to like or corresponding parts, and in which.

DETAILED DESCRIPTION

The present disclosure generally provides systems and methods of detecting objects outside the line-of-sight from a moving platform or vehicle. According to one aspect, the disclosed systems and methods may perceive moving obstacles even when those obstacles are occluded behind an object or around a corner or other static obstacles, such as parked cars. The detection of unseen moving objects by observing changes in illuminance may provide for a controller or other device on the vehicle to predict, anticipate, and take preventative action to avoid potential conflicts and dangerous situations between the trajectories of the occluded object and the vehicle. Aspects of the disclosed system rely on shadow information as a signal and feature (e.g., to detect a shadow object(s)), whereas normally shadows are treated as unwanted noise.

Figure 1:
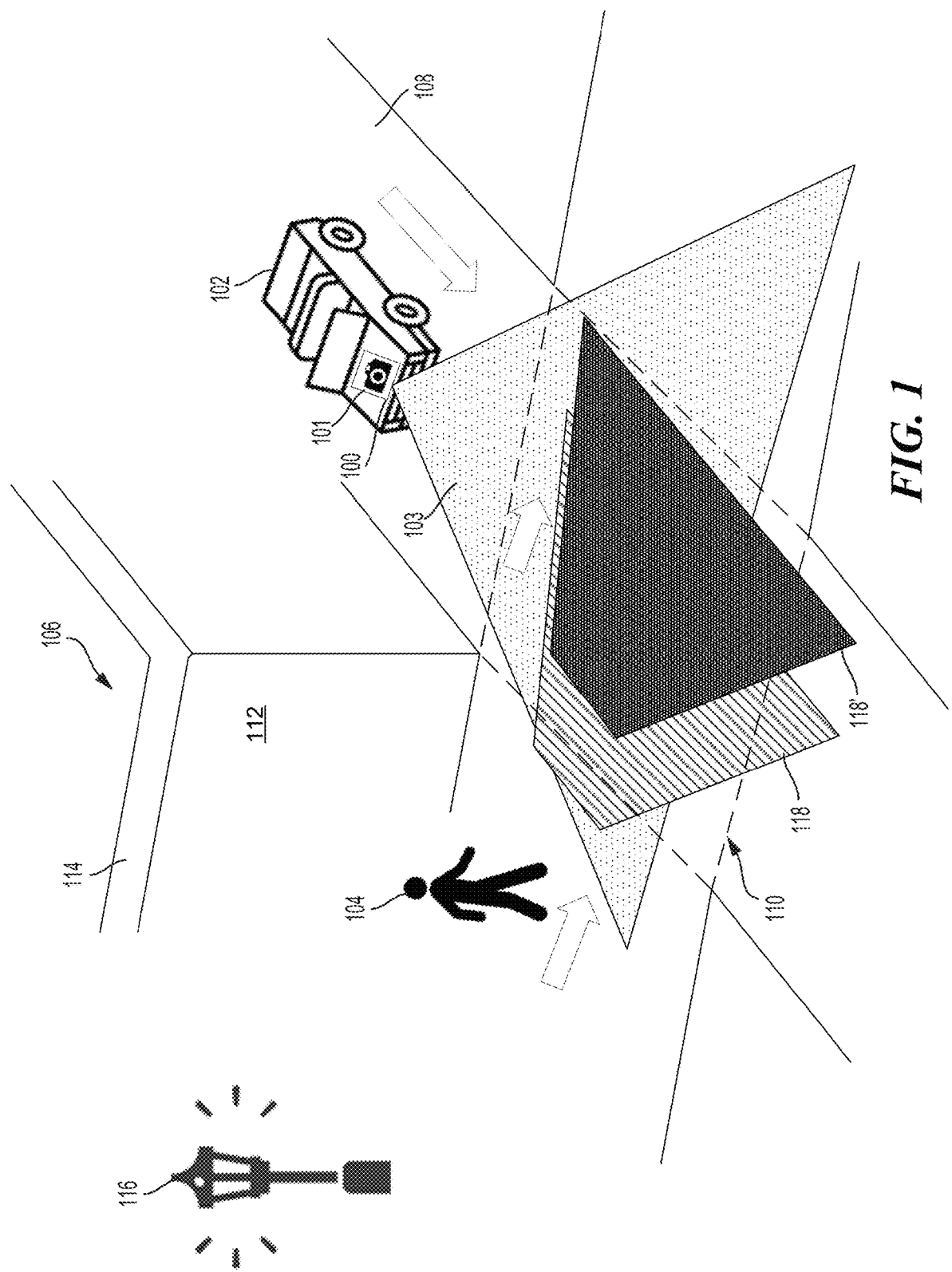
FIG. 1 is a conceptual diagram of an environment in which an object detection system may be implemented according to an aspect of the disclosure.

FIG. 1 depicts an exemplary conceptual environment in which an object detection system 100 may be implemented according to an aspect of the present disclosure. A vehicle 102, or other moving platform, may be equipped with an object detection system 100, including an image capture device 101 (e.g., a camera) or other passive sensors (e.g., thermographic or infrared cameras). The vehicle may be an automobile, autonomous vehicle, semi-autonomous vehicle, mobile robotic platform, wheelchair, or the like.

The object detection system 100 may be configured to detect the presence of an object (e.g., a pedestrian 104) around a corner 106 or other obstruction that blocks or impedes a line-of-sight 103 of the vehicle 102. For example, as the vehicle 102 may be traveling down a roadway 108 towards an intersection 110, a pedestrian 104 may be moving towards the same intersection 110. The pedestrian 104 may be occluded from the vehicle's 102 line-of-sight 103 behind a wall 112 of a building 114 and, thus, the vehicle 102 may be unaware of the pedestrian 104 moving towards the intersection 110. The object detection system 100, according to one aspect of the present disclosure, may perceive a change in illumination in the intersection and cause the vehicle 102 to respond accordingly. This change in illumination may trigger detection of a shadow object (e.g., a pedestrian 104).

For example, a street light 116 or another environmental illumination source may cast a shadow 118 of the pedestrian 104 into the intersection 110. According to one aspect, a pronounced and observable cue from the change in illumination generated by a moving object (e.g., the pedestrian 104) may be perceived by the object detection system 100. The change in illumination, depicted in FIG. 1 as the movement of the shadow 118 to a displaced shadow 118', may be used to predict the movement of the pedestrian 104. In particular, the movement of the pedestrian 104 creates a risk of potential collision with the vehicle 102 if both the vehicle 102 and the pedestrian 104 continue on their present trajectories. While the displaced shadow 118' is shown as having moved further into the intersection, one skilled in the art will recognize that the displaced shadow 118' is shown to reflect a change in illumination, and not necessarily a lateral movement of the shadow itself.

Inferring motion around corners may be accomplished in either daylight or night time. At night, detection of changes in illumination may be more easily discernable due to the contrast of the light and dark surrounding areas. It becomes considerably more challenging, however, to infer motion during daytime or while operating a vehicle in a well-lit environment, as it involves motion detection given a poor signal-to-noise ratio (SNR) due to a sometimes barely visible shadow. In these scenarios, shadows may be enhanced and used as a cue, providing information on whether a potential obstacle behind a corner is present and in motion. According to one aspect of the disclosure, a size, speed, direction, number, or other characteristics of an unseen object may be determined.

According to one aspect of the present disclosure, the problem of anticipating potential collisions with moving obstacles that are occluded behind a corner 106 may be solved using a dynamic threshold on color-amplified, or otherwise enhanced, images. Doing so may allow the detection of shadows, even those shadows weakly visible to a human eye, and affirmative use of the shadow information to assist in controlling the vehicle 102. The object detection system 100 may obtain and classify an image sequence as either "dynamic" or "static." The object detection system 100 may supply a probability of dynamic movement, enabling the vehicle 102 to react and take appropriate action, such as slowing down or stopping as the vehicle 102 approaches the intersection 110.

Figure 2A:
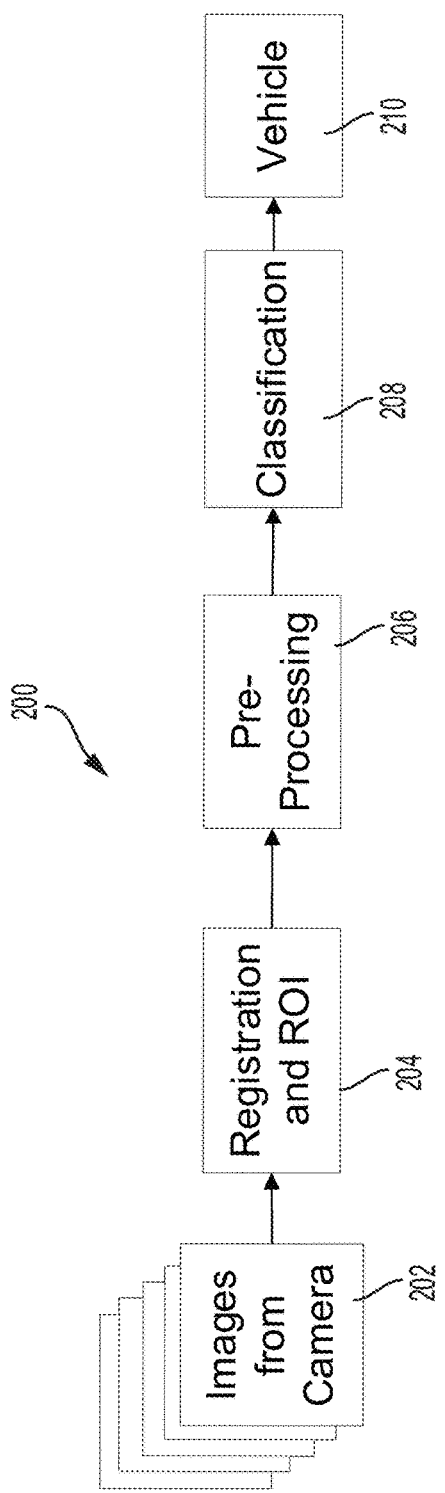
FIG. 2A is a process diagram of an object detection system according to an aspect of the disclosure.

FIG. 2A depicts a process flow 200 of the object detection system 100 according to an aspect of the present disclosure. A camera, or other image capture device, may obtain a sequence of images 202 over time as a vehicle 210 travels down a roadway or other trajectory. The images may be collected and input into a cyclic buffer. The system may use a cyclic frame buffer approach to achieve real-time performance. That is, the system may output a detection result whenever a new image fulfills the specifications for appending to the sequence. The specifications may include appropriately identified markers in the environment and region of interest (ROI) in which the camera is looking, as well as image quality condition.

As shown in FIG. 2A, images may be processed in an image registration and ROI operation 204, or image rectifier, to combine the image data from each of the images collected in the cyclic buffer. This stabilization step is optional and dependent on the structure of the classifier. The ROI may be discernable by the system based on static markers or features of the environment and roadway, such as sidewalks, lane lines, reflectors, or other fixed environmental features by which the system can identify the intersection and location of where important image data may be obtained.

Once a new image gets appended to the sequence, a homography, H, may be generated for each frame to be projected to the viewpoint of the first frame in the sequence. In projective geometry, a homography is an isomorphism of projective spaces, induced by an isomorphism of the vector spaces from which the projective spaces derive. That is, a homography is a transformation (e.g., an n×n matrix) that maps the points in one image to the corresponding points in another image. In this example, the system may apply image registration to all frames i in the current sequence j according to:

$$f_{i,j}(x, y) = f_{j,i}(H(x), H(y)) \quad (1)$$

After the image registration step, the system may crop the projected image according to the identified ROI. For example, hand annotations are used for each corner to crop the region of interest or ROI where it's expected to see a shadow. Other methods of determining the ROI could be map-based, place-recognition-based or deep-learning-based, but this is not the focus of the present disclosure. To reduce noise, the system may down-sample each cropped and registered image using bilinear interpolation to a 100×100 patch:

$$f_{i,j} = \text{resize}(f_{j,i}, (w, h)) \quad (2)$$

After registration and identification of the ROI, the image data may undergo a pre-processing operation 206 to enhance the image data to more readily identify the changes in illumination. Pre-processing techniques by which the image data may be enhanced may include, without limitation, color amplification, contrast enhancement, linear or non-linear filtering, or the like. According to one aspect of the present disclosure, the pre-processing operation may include a dynamic color amplification. The system may determine the mean image of all of the down-sampled images according to:

$$\bar{f}_j = \frac{1}{n}\sum_{i=1}^{n} f_{j,i} \quad (3)$$

The mean image may be subtracted from each frame in the current sequence and a Gaussian blur may be applied before the difference to the mean is amplified. For example, the difference images may be computed according to:

$$d_{j,i} = |G((f_{j,i} - \bar{f}_j), k, \sigma)| * \alpha \quad (4)$$

where G is a linear blur filter of size k using isotropic Gaussian kernels with a covariance matrix diag($\sigma^2$, $\sigma^2$). '$\sigma$' may be chosen depending on k according to $\sigma=0.3 \cdot ((k-1) \cdot 0.5 - 1) + 0.8$. '$\alpha$' may be considered an amplification parameter as it amplifies the difference to the mean image. According to one illustrative aspect, k may be set to 3 and α may be set to 5. This may enhance the image data using color amplification and helps to improve the detectability of a shadow, even if the original signal is invisible to the human eye. This process may increase the SNR ratio. After the frame is color amplified, a temporal low-pass filter may be applied according to:

$$t_{j,i} = d_{j,i} * t + d_{j,i-1} * (1-t) \quad (5)$$

where $t_{j,i}$ is the filtered result of the difference images $d_{j,i}$.

After the image data has undergone the pre-processing operation, the system may analyze the enhanced image data in order to make a classification 208 as to whether the object behind the obstacle, or around the corner, is moving. The system may classify the image data, and the detected object, as static or dynamic. To become more robust against varying sizes and shapes of corners and varying light conditions, a threshold may be applied as to whether the image data is static or dynamic. The difference may be taken from the mean of each channel of the filtered frame as a criterion to determine motion with respect to the standard deviation of the filtered image:

$$c_{j,i} = \begin{cases} 0, & \forall |t_{j,i} - \bar{t}_{i,j}| \leq w * \sigma(t_{j,i}) \\ 1, & \forall |t_{j,i} - \bar{t}_{i,j}| > w * \sigma(t_{j,i}) \end{cases} \quad (6)$$

where w is a tunable parameter that depends on noise distribution, preferably set to w=2. An underlying assumption may be made that dynamic pixels (e.g., those representing movement) are further away from the mean, because their values change more drastically. A combination of dilation and erosion techniques may be used to first connect pixels which were classified as motion. Erosion may be used to reduce noise. Morphological ellipse elements with two different kernel sizes may be applied according to:

$$c_{j,i} = \text{dilate}(c_{j,i}, 1), c_{j,i} = \text{erode}(c_{j,i}, 3) \quad (7)$$

All pixels may then be summed under an intuitive assumption that more movement in between frames will result in a higher sum:

$$s_j = \sum_{i=1}^{n} c_{j,i}(x, y) \quad (8)$$

To classify the whole sequence as either "dynamic" or "static," a camera-specific threshold may be applied. For example, a the threshold percentage of pixels classified as "dynamic" may be set for different camera types, such as a webcam or high-quality DLSR in order to classify the entire scene as dynamic. The noise of the camera may be correlated with the choice of the threshold. That is, a less noisy image may result in fewer miss qualified pixels, which, in turn, results in a lower threshold. Therefore, a better camera, with a high frame rate and resolution and a better image registration quality, may lead to a smaller threshold.

According to aspects of the present disclosure, a solution to the problem of detecting dynamic obstacles out of the direct line-of-sight from the viewpoint of a moving vehicle based on shadows is improved using a tool referred to herein as a shadow camera ("ShadowCam"). According to aspects of the present disclosure, a ShadowCam is used as an additional advance driver assistance system (ADAS) feature to provide safety by increasing the situational awareness of a human driver. According to a further aspect of the present disclosure, a ShadowCam is used as an additional perception module of an autonomous vehicle for increased safety.

Referring again to FIG. 1, the problem setup is visualized, in which the number (102) marks the vehicle, the number (110) marks the known region of interest (ROI) where a shadow is expected to be detected and the number (104) marks the dynamic obstacle out of the line-of-sight 103. As described above, FIG. 2A depicts the process flow 200 of the object detection system 100 according to an aspect of the present disclosure. The process flow 200 of the object detection system 100, however, may rely on visual fiduciary markers. One aspect of the present disclosure omits appropriately identified visual fiduciary markers in the environment by relying on image registration using homography estimation to cancel out ego motion in a cyclic buffer, as shown in FIG. 2B.

Figure 2B:
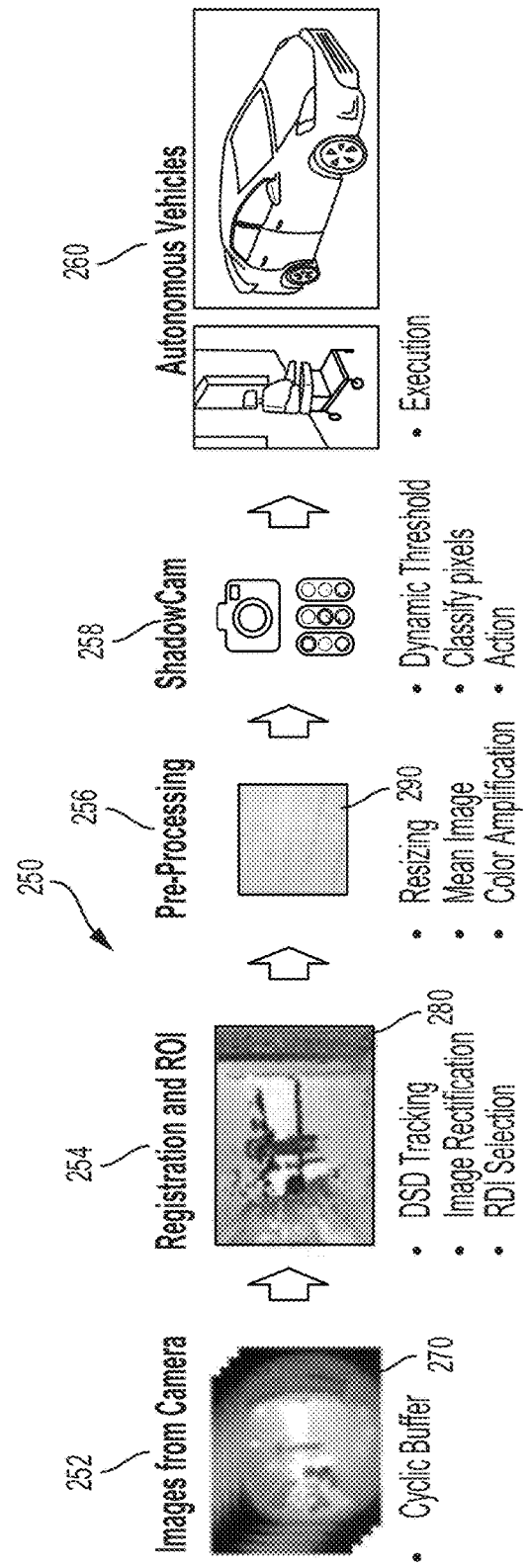
FIG. 2B illustrates a ShadowCam pipeline of an object detection system, according to one aspect of the present disclosure.

FIG. 2B illustrates a ShadowCam pipeline 250, according to one aspect of the present disclosure. Aspects of the present disclosure provide core extensions to the process flow 200, including image registration via-homography estimation to cancel out ego motion in a cyclic buffer using methods that help to estimate the homographies between frames to register images. These methodologies may include integration of a visual odometry method, a visual inertia odometry method and/or a feature based/direct visual odometry for image registration. Other methodologies include simultaneous localization and mapping, any other odometry method based on motion sensors, wheel encoder, inertial measure unit (IMU), global positioning system (GPS), and the like. Other possible methodologies include localization methods in maps (e.g., laser scan matching). This enables the human driver or the autonomous vehicle to avoid potential collisions with dynamic obstacles out of the direct line-of-sight at day and night time driving conditions.

The process flow 200 of FIG. 2A is enhanced to form the ShadowCam pipeline 250 illustrated in FIG. 2B. In this configuration, the ShadowCam pipeline 250 is also composed of five stages. During a first stage, a cyclic buffer 270 is run with an image stream 252 from a camera, such as the camera 101 shown in FIG. 1. During a second stage 254, an image registration method is run on the cyclic buffer 270. This second stage 254 also includes a region of interest or ROI selection based, for example, on annotations. Another approach to identify the ROI may rely on feature tracking, on a neural-net-based approach, or on other ego motion estimation techniques, such as visual odometry. As time passes, a new image may be obtained and added to the cyclic buffer 270 while the oldest image is cycled out of the cyclic buffer.

In this configuration of the ShadowCam pipeline 250, an output of the second stage 254 is a registered buffer 280 (e.g., a frame sequence) with ROI selection. During a third stage 256 (e.g., a pre-processing stage) a mean image of the current sequence is computed, resized and amplified. The output of this third stage 256 is a frame sequence with the same size for the image registration method to provide a pre-processed image sequence 290. A fourth stage 258 of the ShadowCam pipeline 250 applies a ShadowCam classification algorithm to decide whether it is safe to continue along a current path based on the pre-processed image sequence 290. During a fifth stage 260 of the ShadowCam pipeline 250, a vehicle interface executes the decision from the ShadowCam classification algorithm.

The ShadowCam pipeline 250 runs on the cyclic buffer 270 and in a pre-processing step projects all images of the cyclic buffer 270 to the same viewpoint, as part of an image registration step. According to aspects of the present disclosure, the ShadowCam algorithm is run on these registered image sequences to detect dynamic obstacles. In one configuration, image registration via homographic registration relies on a visual odometry method (e.g., Direct Sparse Odometry (DSO)) to compute a rotation matrix and a translation vector between each frame for projection into a same coordinate system.

Image Registration

Image registration generally refers to the process of transforming multiple images into the same coordinate system. This process can be split into four steps: (1) feature detection (e.g., oriented FAST and rotated BRIEF (ORB), scale-invariant feature transform (SIFT), or speeded up robust features (SURF)); (2) feature matching; (3) estimating the homography based on the matched feature points; and (4) resampling and transformation of the image with an appropriate interpolation technique. These steps lead to (Eq. 9), in which a homography H transforms points of two planes (up to a scale-factor s) with 8 Degrees of Freedom (DOF):

$$s\begin{bmatrix}x'\\y'\\1\end{bmatrix}=H\begin{bmatrix}x\\y\\1\end{bmatrix}=\begin{bmatrix}h_{11}&h_{12}&h_{13}\\h_{21}&h_{22}&h_{23}\\h_{31}&h_{32}&h_{33}\end{bmatrix}\begin{bmatrix}x\\y\\1\end{bmatrix}\qquad(9)$$

Eq. 9 enables overlaying of two or more images from the same environment, but shot from different angles. A visual odometry method (e.g., direct sparse odometry (DSO)) is one method for image registration, according to aspects of the present disclosure. In one configuration, direct sparse odometry (DSO) is used for image registration rather than feature-based image registration methods (e.g., simultaneous localization and mapping (SLAM), ORB-SLAM, etc.). DSO image registration is a sparse and direct method for monocular visual odometry. DSO enables join optimization of the full likelihood for all involved model parameters, including camera poses, camera intrinsics, and geometry parameters (e.g., inverse depth values).

DSO image registration computes the pose for each frame ($M_t$,), which is composed of the rotation matrix R and the translation vector t. In the following section, we describe how we obtain the homography H mathematically from R and t. The homography is proportional to the information given by the planar surface equation, the rotation matrix R and the translation vector t between two image frames, according to Eq. 10:

$$H \propto R - tn^T \qquad(10)$$

where n designates the normal of the local planar approximation of the scene. Symbols used in the following description are described in Table I.

TABLE 1

SYMBOL TABLE DESCRIPTION OF VARIABLES USED IN THIS SECTION

| Symbol | Description |
|---|---|
| $M_c^w$ | Camera pose, transformation from camera c to world w frame (4 × 4 matrix) |
| $R_c^w$ | Rotation matrix, rotation from camera c to world w frame (3 × 3 matrix) |
| $t_c^w$ | Translation vector, translation from camera c world w frame (3 × 1 matrix) |
| $H_{c1}^{c2}$ | Homography matrix, projection from camera $c_1$ to $c_2$ frame (3 × 3 matrix) |
| K | Camera intrinsics (3 × 3 matrix) |
| $n_{c1}$ | Plane normal in camera frame $c_1$ (3 × 1 matrix) |
| $d_{c1}$ | Distance between camera $c_1$ and plane (scalar) |

A DSO image registration algorithm shown below provides an overview of how the following equations are connected to get the homgraphy H from the rotation matrix R and the translation vector t for each frame. We obtain R and t for the first frame in the buffer and register all following frames with respect to the first frame (e.g, in DSO Alg. denoted as $c_2$). That is, using the DSO image registration algorithm, all frames are projected into the same coordinate system. This DSO image registration provides a homography estimation to cancel out ego motion in the cyclic buffer 270.

| Algorithm 2 DSO Image Registration |
|---|
| 1: planePoints$_w$ ← parametersFromFile( ) |
| 2: R$_{c2}$ ← getRotationMatrix(0) ▷ Rotation matrix of first frame in cyclic buffer |
| 3: T$_{c2}$ ← getTranslationVector(0) ▷ Translation vector of first frame in cyclic buffer |
| 4: for all i=1; i$_i$ buffer.length; i+++ do |
| 5:     R$_{c1}$ ← getRotationMatrix(i) |
| 6:     T$_{c1}$ ← getTranslationVector(i) |
| 7:     planePoints$_{c1}$ ← Eq. 3 ▷ Transformation of world plane points to $c_1$ |
| 8:     R$_{c1}{}^{c2}$ ← Eq. 6 ▷ Obtaining rotation matrix from $c_1$ to $c_2$ |
| 9:     t$_{c1}{}^{c2}$ ← Eq. 7 ▷ Obtaining translation vector from $c_1$ to $c_2$ |
| 10:    n$_{c1}$ ← computeNormal(planePoints$_{c1}$) |
| 11:    d$_{c1-}$ ← computeDistance( ) |
| 12:    H$_{c1}{}^{c2}$ ← Eq. 8 ▷ Calculating homography matrix |
| 13:    f$_{c1}$ warpPerspective(f$_{c1}$) |

Three points on the ground plane and in the world frame w are annotated. This results in reasonable transformations for most pixels on the ground plane. This is important because later in the pipeline, the goal is to classify shadows close to a corner on this plane. After obtaining R and t of frame $f_i$ it is possible to transform the points on the plane and in the world frame w to the camera frame $c_1$. $M_w{}^c$ in homogeneous form transforms points from the world frame (denoted as w) into the camera frame (denoted as c):

$$\begin{bmatrix} X_c \\ Y_c \\ Z_c \\ 1 \end{bmatrix} = M_w^c \begin{bmatrix} X_w \\ Y_w \\ Z_w \\ 1 \end{bmatrix} = \begin{bmatrix} R_w^c & t_w^c \\ 0_{1 \times 3} & 1 \end{bmatrix} \begin{bmatrix} X_w \\ Y_w \\ Z_w \\ 1 \end{bmatrix} \quad (11)$$

Given K the camera's intrinsic matrix and $M_w{}^c$ n the camera's pose we can obtain the image points directly from world points in the following way:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} X_w \\ Y_w \\ Z_w \\ 1 \end{bmatrix} \quad (12)$$

With both positions of the camera ($M_w{}^{c1}$ and $M_w{}^{c2}$, where $c_2$ is the camera frame of the first image in the cyclic buffer) we can find the transformation for a 3D point from camera frame $c_1$ to $c_2$:

$$M_{c1}^{c2} = M_w^{c2} \cdot (M_w^{c1})^{-1} = \begin{bmatrix} R_w^{c2} & t_w^{c2} \\ 0_{3 \times 1} & 1 \end{bmatrix} \cdot \begin{bmatrix} (R_w^{c1})^T & -(R_w^{c1})^T \cdot t_w^{c1} \\ 0_{1 \times 3} & 1 \end{bmatrix} \quad (13)$$

This allows us to specify the rotation matrix R:

$$R_{c1}^{c2} = R_w^{c2} \cdot (R_w^{c2})^T \quad (14)$$

and the translation vector t between two frames:

$$t_{c1}^{c2} = R_w^{c2} \cdot (-(R_w^{c1})^T \cdot t_w^{c1}) + t_w^{c2} \quad (15)$$

With the distance d as the dot product between the plane normal and a point on the plane, this leads to the homography H from $c_1$ to $c_2$:

$$H_{c1}^{c2} = R_{c1}^{c2} - \frac{t_{c1}^{c2} \cdot (n_{c1})^T}{d_{c1}} \quad (16)$$

which is the same as Eq. 10, including scaling.

ShadowCam Classifier

The classifier is the same as proposed in Eq. 15. The core parts of the classifier amplify a weak signal and distinguish sequences into "dynamic" or "static" depending on whether a moving obstacle was around the corner by using a threshold based on mean and standard deviation. Aspects of the present disclosure provide a technical approach to tackle the problem of detecting moving obstacles out of the direct line-of-sight from the view point of the vehicle based on shadows. During the pre-processing step, the sometimes weak shadow signal gets amplified. In one configuration, the decision by the ShadowCam classifier of whether it is safe to move ahead is based on a pixel sum per sequence and a predetermined threshold other classifiers could rely on other statistical methods, deep-learning or an SVM.

Figure 3A:
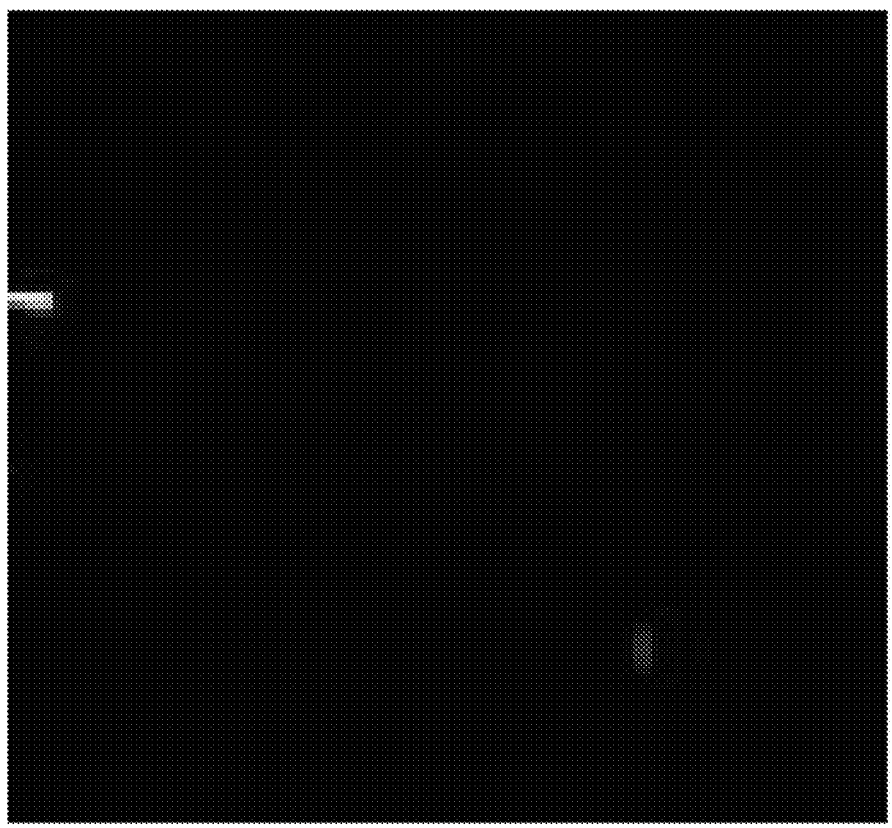
FIGS. 3A and 3B depict processed image data according to an aspect of the disclosure.
Figure 3B:
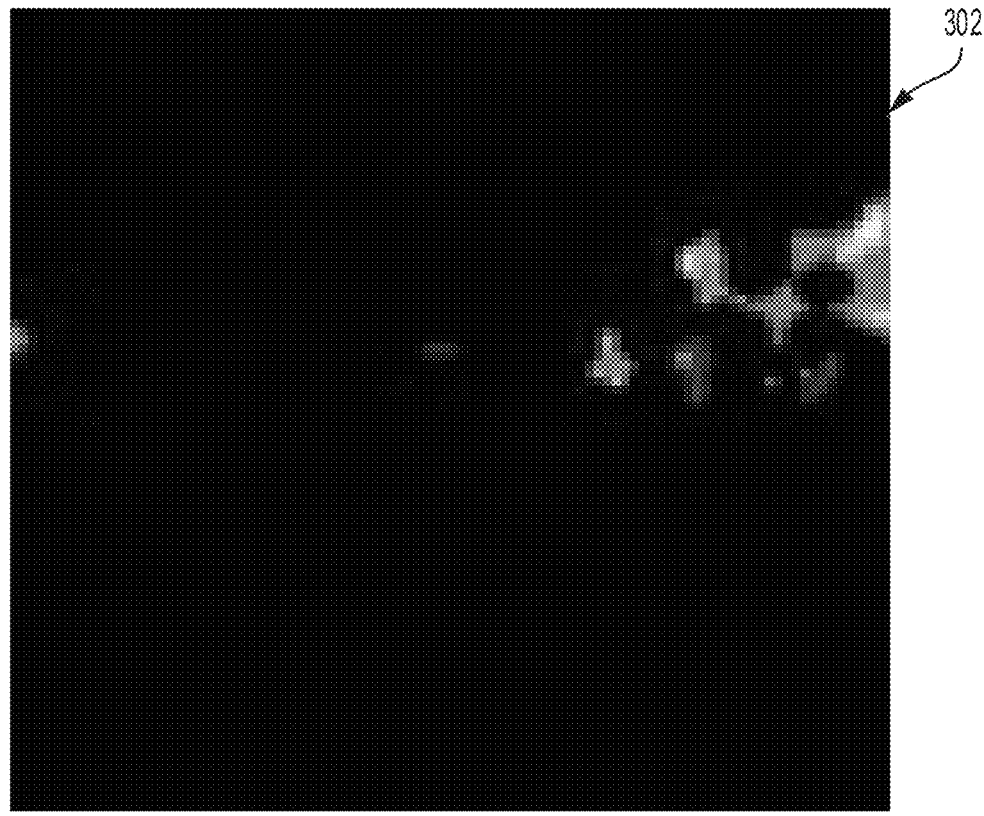

FIGS. 3A and 3B depict conceptual images of registered and pre-processed image data, according to one aspect of the present disclosure. FIG. 3A depicts a representation where no movement is discerned, indicating either a lack of presence of an object, or a stationary object. FIG. 3B, on the other hand, depicts a registered and pre-processed image in which the differentiated pixels 302 of the image map, and their various colors or shades, indicate movement of an object. The sum of the pixel values in the processed image may be compared to a threshold value to determine if the movement is significant enough to classify the image as dynamic.

After a classification of static or dynamic is made, a temporal filter on the detection results may be run to further smooth the signal. Other outlier rejection methods may also be used to produce a smoothed-out signal. This output signal may be used to control the vehicle or for validation purposes. The system may output a control signal or an operation to the vehicle to act based upon the detected object and its movement, if any. If the scene is identified and classified as dynamic, the control signal, in an autonomous or semi-autonomous vehicle, or the like, may include a control operation to slow the vehicle down, stop the vehicle or take other preventative actions. For example, the control signal may be a command to halt a trajectory of the ego vehicle.

Figure 4:
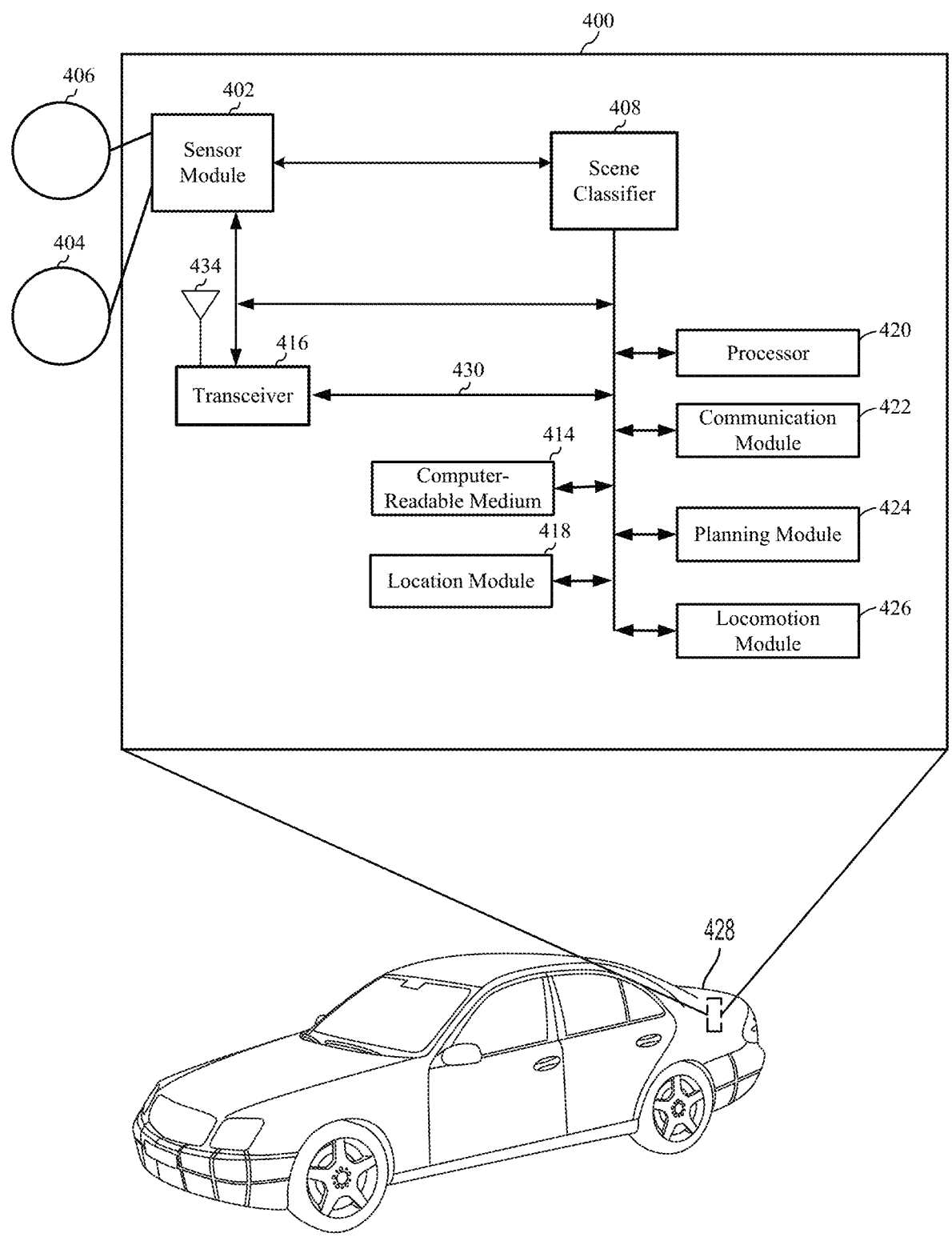
FIG. 4 is a diagram illustrating an example of a hardware implementation for a scene classifier system, according to aspects of the present disclosure.

FIG. 4 is a diagram illustrating an example of a hardware implementation for a scene classification system 400, according to aspects of the present disclosure. The scene classification system 400 may be a component of a vehicle, a robotic device, or other device. For example, as shown in FIG. 4, the scene classification system 400 may be a component of a car 428. Aspects of the present disclosure are not limited to the scene classification system 400 being a component of the car 428, as other devices, such as an ego vehicle, bus, boat, wheelchair, drone, robot, or flying object are also contemplated for using the scene classification system 400. The car 428 may be autonomous or semi-autonomous or non-autonomous. For example, if the car 428 is configured as a Level 0 vehicle, in which a set of advanced driver assistance system (ADAS) features installed in the car 428 provide no vehicle control, but may issue warnings to the driver.

The scene classification system 400 may be implemented with a bus architecture, represented generally by a bus 430. The bus 430 may include any number of interconnecting buses and bridges depending on the specific application of the scene classification system 400 and the overall design constraints. The bus 430 may link together various circuits including one or more processors and/or hardware modules, represented by a processor 420, a communication module 422, a location module 418, a sensor module 402, a locomotion module 426, a planning module 424, and a computer-readable medium 414. The bus 430 may also link various other circuits such as timing sources, peripherals, voltage regulators, and power management circuits, which are well known in the art, and therefore, will not be described any further.

The scene classification system 400 may include a transceiver 416 coupled to the processor 420, the sensor module 402, a scene classifier 408, the communication module 422, the location module 418, the locomotion module 426, the planning module 424, and the computer-readable medium 414. The transceiver 416 is coupled to an antenna 434. The transceiver 416 communicates with various other devices over a transmission medium. For example, the transceiver 416 may receive commands via transmissions from a user or a remote device. As another example, the transceiver 416 may transmit driving statistics and information from the scene classifier 408 to a server (not shown).

The scene classification system 400 may include the processor 420 coupled to the computer-readable medium 414. The processor 420 may perform processing, including the execution of software stored on the computer-readable medium 414 providing functionality according to the present disclosure. The software, when executed by the processor 420, causes the scene classification system 400 to perform the various functions described for a particular device, such as the car 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the scene classifier 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the car 428 or may be in communication with the car 428.

The location module 418 may be used to determine a location of the car 428. For example, the location module 418 may use a global positioning system (GPS) to determine the location of the car 428. The communication module 422 may be used to facilitate communications via the transceiver 416. For example, the communication module 422 may be configured to provide communication capabilities via different wireless protocols, such as Wi-Fi, long term evolution (LTE), 3G, etc. The communication module 422 may also be used to communicate with other components of the car 428 that are not modules of the scene classification system 400.

The locomotion module 426 may be used to facilitate locomotion of the car 428. As an example, the locomotion module 426 may control movement of the wheels. As another example, the locomotion module 426 may be in communication with a power source of the car 428, such as an engine or batteries. Of course, aspects of the present disclosure are not limited to providing locomotion via wheels and are contemplated for other types of components for providing locomotion, such as propellers, treads, fins, and/or jet engines.

The scene classification system 400 may also include the planning module 424 for planning a route or controlling the locomotion of the car 428, via the locomotion module 426, based on the analysis performed by the scene classifier 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The scene classifier 408 may be in communication with the sensor module 402, the transceiver 416, the processor 420, the communication module 422, the location module 418, the locomotion module 426, the planning module 424, and the computer-readable medium 414. In one configuration, the scene classifier may receive sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the scene classifier 408 may receive sensor data directly from the first sensor 406 and the second sensor 404.

As shown in FIG. 4, the scene classifier 408 may be used to classify an environmental scene as detailed herein. For example, the scene classifier 408 may detect an unseen object around a corner or behind an obstacle. The scene classifier 408 may receive information from one of the sensors 404, 406, such as a series of images for input into a cyclic buffer. Those images may be processed, enhanced and registered, as described herein, and the scene classifier may classify the environment based on any perceived motion or change in illumination of the images in the cyclic buffer. The scene classifier may determine the environment as static or dynamic, or may assign a probability of dynamic movement based upon the processed image information.

The scene classifier 408 may output the classification to one or more of the sensor modules 402, the transceiver 416, the processor 420, the communication module 422, the location module 418, the locomotion module 426, the planning module 424, and the computer-readable medium 414. The classification output may be used to control the car 428 in response to the classification. For example, if the scene is classified as dynamic, or has a high probability of being dynamic, signals may be transmitted to the communication module 422, the location module 418, the locomotion module 426, the planning module 424, and the computer-readable medium 414 such that the car 428 may take corrective action, such as slowing down or stopping.

In such a manner the scene classifier 408 may use shadow information as a signal, instead of noise, to generate or perceive affirmative and useful information in the scene for the purpose of controlling the car 428.

Figure 5:
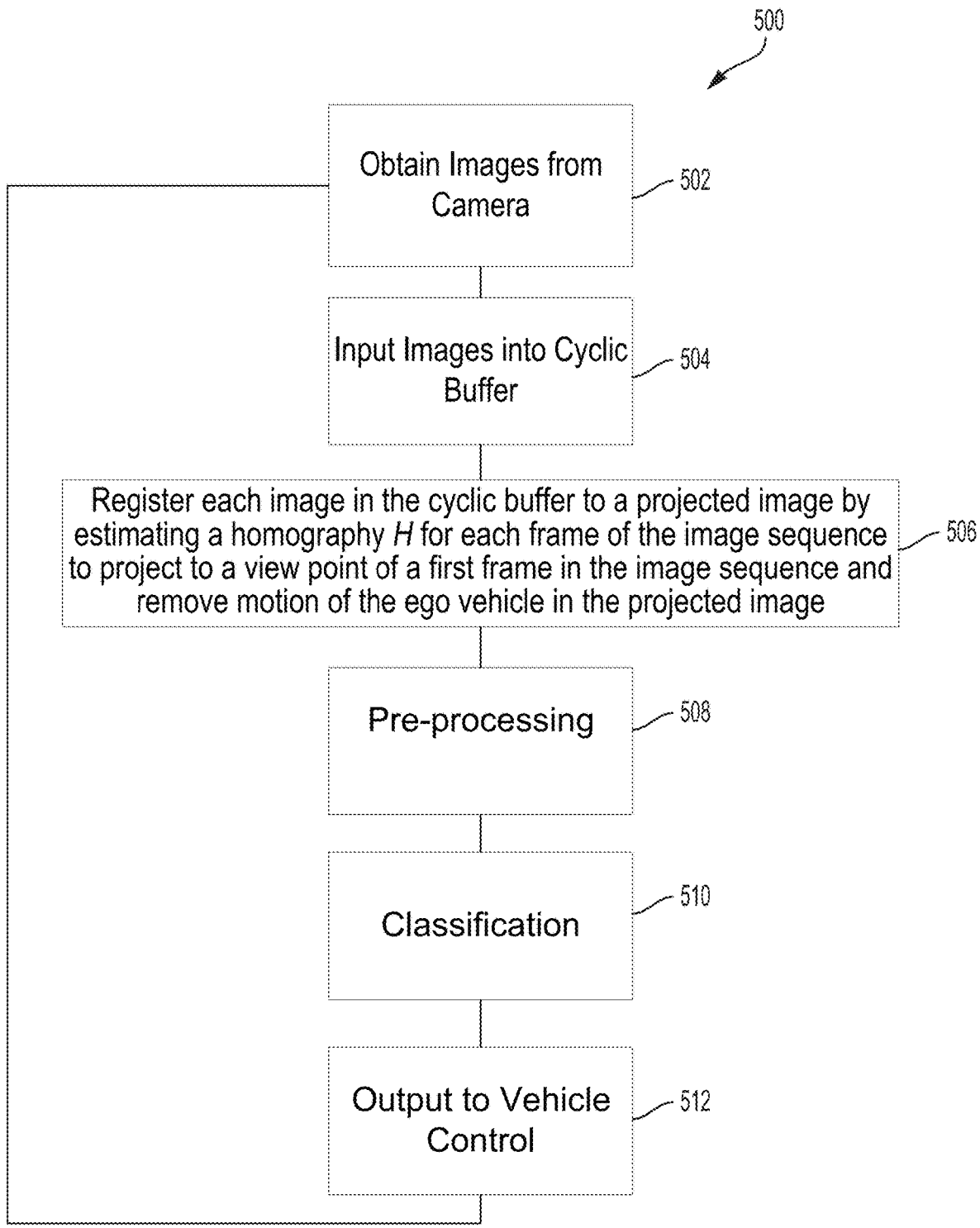
FIG. 5 is a flow diagram of a method of detecting an object according to an aspect of the present disclosure.

FIG. 5 depicts a flow diagram of a scene classification method, implemented in an autonomous or semi-autonomous vehicle, according to one aspect of the present disclosure. According to aspects of the present disclosure, and described herein, a scene classification method 500 may begin, as shown in block 502, by obtaining a sequence of images from a camera, such as an RGB camera. As shown in block 504, the images obtained may be input into a cyclic buffer where they may undergo a registration and ROI determination process, as shown in block 506. The sequence of images may be registered in to a single projected image in which one or more ROIs may be determined from the projected image data. In one aspect of the present disclosure, each image in the cyclic buffer is registered to a projected image by estimating a homography H for each frame of the image sequence to project to a view point of a first frame in the image sequence and remove motion of the ego vehicle in the projected image.

As shown in block 508, the projected image may undergo pre-processing to enhance the image data to more readily determine changes in illumination. The projected image may be enhanced using any number of image processing techniques, including but not limited to, color amplification, contrast enhancement, linear or non-linear filtering, or the like. As shown in block 510, after the image data has undergone pre-processing enhancement, the scene classification method 500 may analyze the enhanced image data in order to make a classification as to whether a moving, unseen object is perceived.

As described herein, substantial changes in illumination, and more specifically, the pixel values of the sequence of images and the combined projected image, may form a perception of movement of an object around a corner or behind an obstruction. The system may classify the image data and consequently the scene and the detected object, as static or dynamic. As shown in block 512, if the scene classification method 500 makes a determination of a dynamic scene, a signal may be transmitted to a communications or control system which may then take appropriate action, such as alerting an operator or a passenger, or causing the vehicle to stop or slow down.

The scene classification method 500 may be run cyclically or periodically according to a chosen frequency of image captures. Once a classification is made, or a given period of time has passed, a new image may be obtained by the camera and cycled into the buffer, replacing or pushing the oldest image out. The updated sequence of images may then undergo the process as detailed above, providing an updated scene classification as the vehicle travels through the environment.

According to aspects of the present disclosure, the solution to the problem of detecting dynamic obstacles out of the direct line-of-sight from the viewpoint of a moving vehicle based on shadows is improved by using a ShadowCam. According to aspects of the present disclosure, the ShadowCam is used as an additional advance driver assistance system (ADAS) feature to provide safety by increasing the situational awareness of a human driver. According to a further aspect of the present disclosure, a ShadowCam is used as an additional perception module of an autonomous vehicle, as shown in FIGS. 6A and 6B.

Figure 6A:
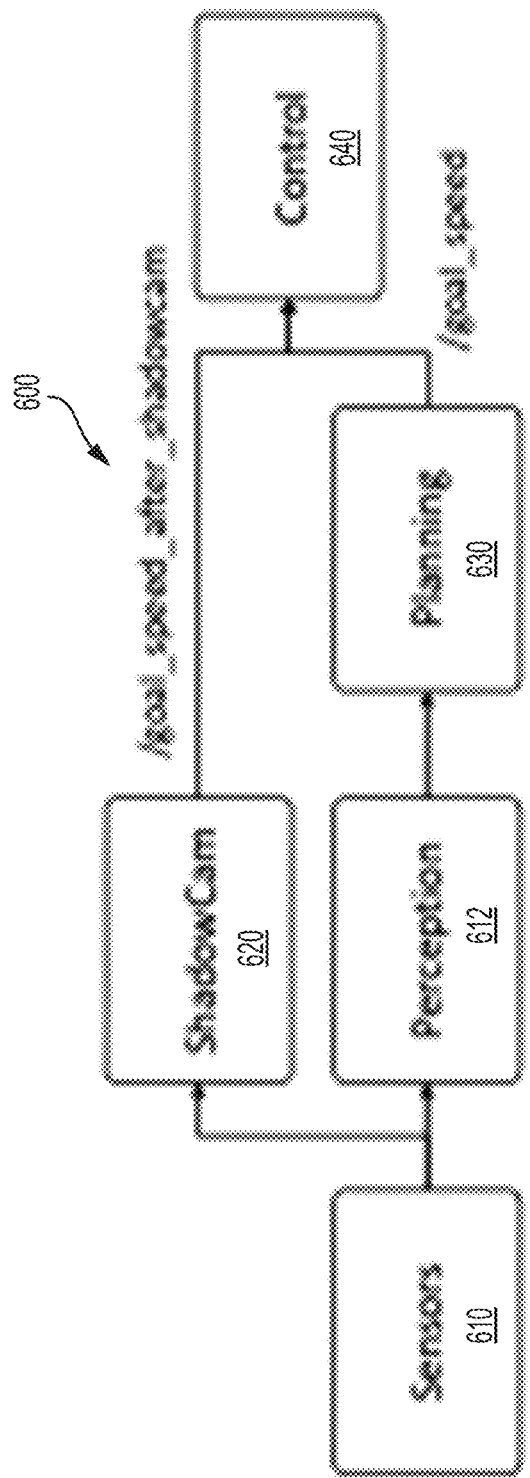
FIGS. 6A and 6B are block diagrams of an autonomous agent system configured for non-line-of-sight (NLoS) obstacle detection, according to aspects of the present disclosure.
Figure 6B:
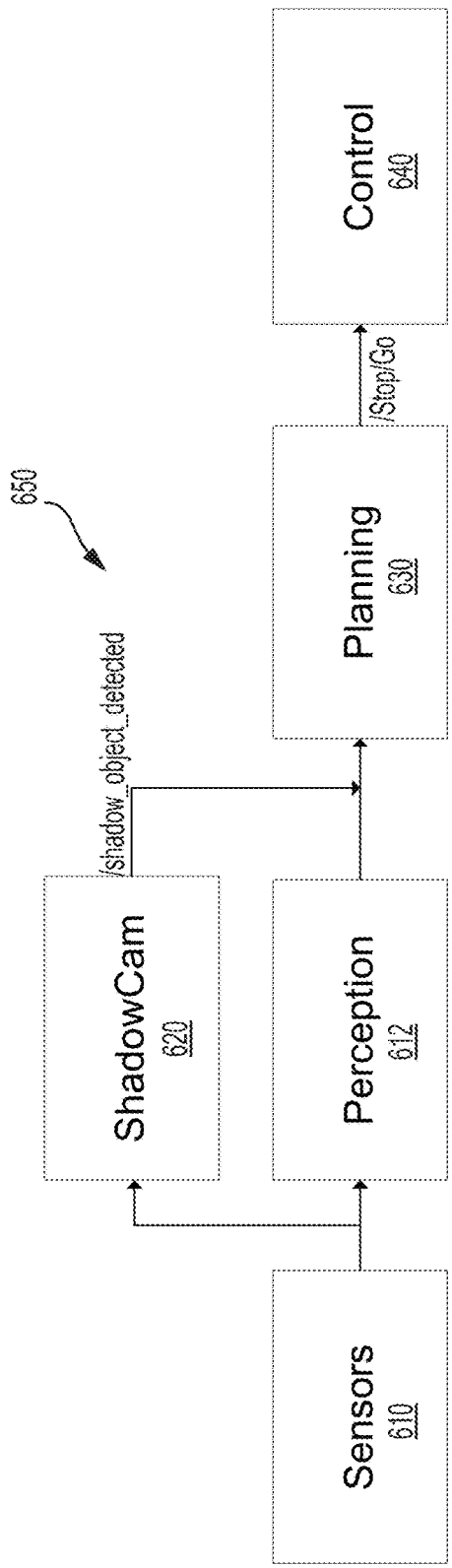

FIGS. 6A and 6B are block diagrams of an autonomous system architecture configured for non-line-of-sight (NLoS) obstacle detection, according to aspects of the present disclosure. In this configuration, an autonomous agent system 600 (or alternatively an autonomous vehicle system) in FIG. 6A, as well as an autonomous agent system 650 in FIG. 6B, is configured to incorporate a ShadowCam Module 620. FIGS. 6A and 6B include a sensor module 610, a perception module 612, a planning module 630, and a control module 640, which may be similar to components of the hardware implementation for the scene classification system 400 shown in FIG. 4.

As shown in FIG. 6A, the autonomous agent system 600 architecture illustrates the concept of a ShadowCam pipeline, in which the control module actuates an autonomous vehicle based on a minimum function (min(/goal_speed_after_shadowcam, /goal_speed)). As shown in FIG. 6B, the autonomous agent system 650 architecture, in which the planning module 630 directly incorporates an output signal (/shadow_object_detected) from the ShadowCam module 620. In response to the output signal (/shadow_object_detected) from the ShadowCam module 620, the planning module 630 outputs a stop/go decision (e.g., /stop/go) to the control module.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than, the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array (FPGA) signal or other programmable logic device (PLD), discrete gate or transistor logic, discrete hardware components, or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read-only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media, including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of non-line-of-sight (NLoS) obstacle detection for an ego vehicle, comprising:
   capturing a sequence of images over a period with an image capture device;
   storing the sequence of images in a cyclic buffer;
   registering each image in the cyclic buffer to a projected image by estimating a homography H for each frame of the sequence of images to project to a view point of a first frame in the sequence of images and remove motion of the ego vehicle in the projected image;
   enhancing the projected image through dynamic color amplification during daytime operation of the ego vehicle;
   classifying an enhanced, projected image based on a scene determination; and
   issuing a control signal to the vehicle upon classifying the projected image.

2. The method of claim 1, wherein classifying the projected image comprises classifying the image as a dynamic scene.

3. The method of claim 1, wherein classifying the projected image comprises determining a probability of a scene as one of static or dynamic.

4. The method of claim 1, further comprising determining a region of interest (ROI) from the projected image.

5. The method of claim 1, wherein the control signal comprises a command to halt a trajectory of the vehicle.

6. The method of claim 1, wherein the projected image comprises a plurality of pixel values and classifying the projected image further comprises:
   summing the pixel values of the projected image and comparing the summing to a threshold value, the classifying based on the threshold value.

7. The method of claim 6, wherein the plurality of pixel values of the projected image are indicative of a change in illumination in the sequence of images.

8. The method of claim 1, wherein classifying the projected image comprises determining a speed of an unseen object.

9. The method of claim 1, wherein classifying the projected image comprises determining a direction of an unseen object.

10. The method of claim 1, wherein the classifying the projected image comprises determining a size of an unseen object.

11. A non-transitory computer-readable medium having program code recorded thereon for non-line-of-sight (NLoS) obstacle detection of an ego vehicle, the program code being executed by a processor and comprising:
    program code to capture a sequence of images over a period with an image capture device;
    program code to store the sequence of images in a cyclic buffer;
    program code to register each image in the cyclic buffer to a projected image by estimating a homography H for each frame of the sequence of images to project to a view point of a first frame in the sequence of images and remove motion of the ego vehicle in the projected image;
    program code to enhance the projected image through dynamic color amplification during daytime operation of the ego vehicle;
    program code to classify an enhanced, projected image based on a scene determination; and
    program code to issue a control signal to the vehicle upon classifying the projected image.

12. The non-transitory computer-readable medium of claim 11, wherein the control signal comprises a command to halt a trajectory of the vehicle.

13. The non-transitory computer-readable medium of claim 11, wherein the projected image comprises a plurality of pixel values and the program code to classify the projected image further comprises program code to sum the pixel values of the projected image and comparing the sum to a threshold value, the classifying based on the threshold value.

14. The non-transitory computer-readable medium of claim 13, wherein the plurality of pixel values of the projected image are indicative of a change in illumination in the sequence of images.

15. The non-transitory computer-readable medium of claim 11, wherein the program code to classify the projected image comprises program code to determine a speed of an unseen object.

16. The non-transitory computer-readable medium of claim 11, the program code to classify the projected image comprises program code to determine a direction of an unseen object.

17. The non-transitory computer-readable medium of claim 11, wherein the program code to classify the projected image comprises program code to determine a size of an unseen object.

18. A system for non-line-of-sight (NLoS) obstacle detection in an ego vehicle, the system comprising:
    an image capture device configured to capture a sequence of images over a period;
    a cyclic buffer configured to store the sequence of images;
    a registered buffer configured to register each image in the cyclic buffer to a projected image in the registered buffer by an image rectifier configured to estimate a homography H for each frame of the sequence of images to project to a view point of a first frame in the sequence of images and remove motion of the ego vehicle in the projected image;
    an image processor configured to enhance the projected image through dynamic color amplification during daytime operation of the ego vehicle;
    an image classifier configured to classify an enhanced, projected image based on a scene determination; and
    a vehicle planner in communication with a vehicle controller, the vehicle planner configured to issue a control signal to the vehicle controller upon classifying the projected image.

19. The system of claim 18, wherein the control signal comprises a command to halt a trajectory of the ego vehicle.

20. The system of claim 19, wherein a shadow object is detected to trigger the command to halt the trajectory of the ego vehicle.

* * * * *